May 19, 1925.
J. B. GRAINGE
GRAPEFRUIT CORING IMPLEMENT
Filed Oct. 24, 1924
1,538,398
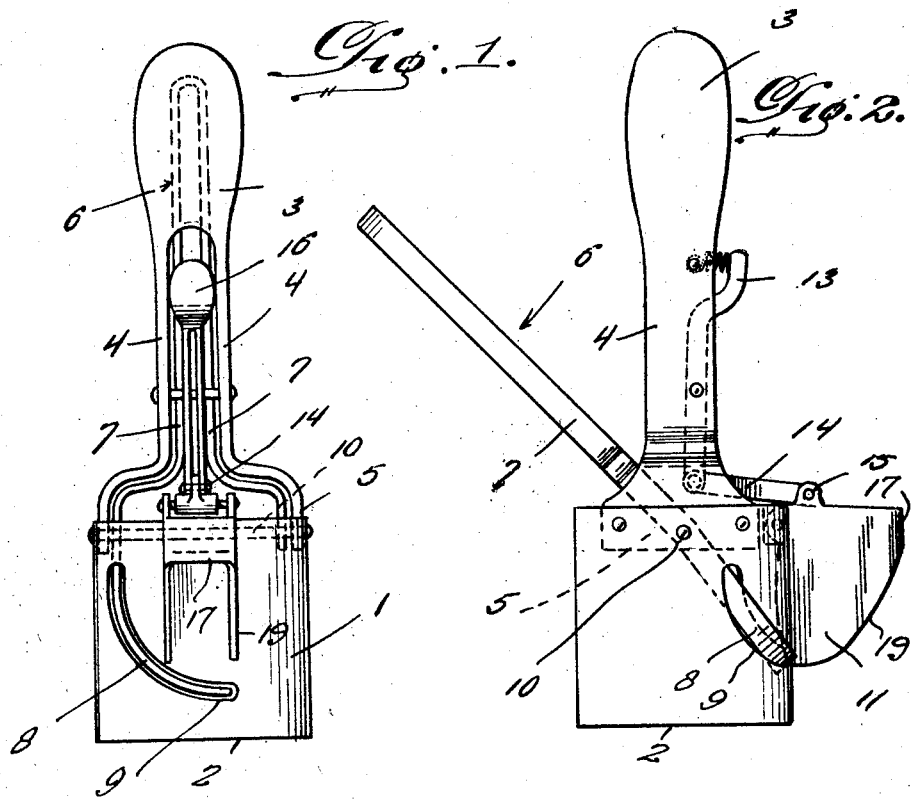
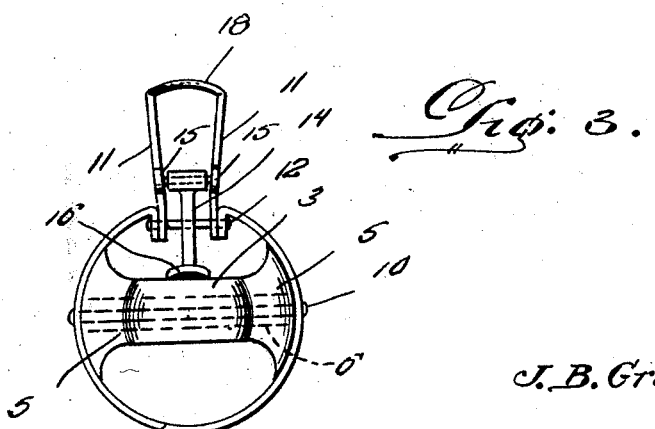
J. B. Grainge
Inventor
By [signature]
Attorney Patented May 19, 1925.

1,538,398

UNITED STATES PATENT OFFICE.

JOHN B. GRAINGE, OF ORLANDO, FLORIDA.

GRAPEFRUIT-CORING IMPLEMENT.

Application filed October 24, 1924. Serial No. 745,649.

*To all whom it may concern:*

Be it known that I, JOHN B. GRAINGE, a citizen of the United States, residing at Orlando, in the county of Orange and State of Florida, have invented certain new and useful Improvements in a Grapefruit-Coring Implement, of which the following is a specification.

This invention relates to an improved implement which relates to the class of inventions commonly known as grapefruit corers.

The principal aim is to generally improve upon devices of this class now marketed and patented by providing one which is constructed for both removing the core and separating the pulp from the webs or walls of the cells to permit it to be readily removed with a spoon.

More specifically, I propose to provide an implement of this class which comprises a cylinder adapted to be forced down into the center of the halved fruit, and equipping the same with an arcuate cutting knife for severing the core from the skin to permit it to be removed.

I also contemplate equipping the cutting cylinder with an improved slicing device for severing the pulp from the webs or walls of the cells so that it can be readily disconnected from the skin with a spoon when eating.

The specific structural details and arrangement of parts forming the improved novel and advantageous structure will become apparent from the following description and drawing.

In the accompanying drawing forming a part of this application and in which like numerals are employed to designate like parts throughout the same:

Figure 1 is a front elevation of a coring implement constructed in accordance with the present invention.

Figure 2 is a side elevation thereof, and

Figure 3 is a top plan view of the same.

As before intimated, the device preferably comprising a cylinder 1, which has its lower edge sharpened to provide a cutting edge 2. This cylinder is adapted to be forced down into the center of the halved fruit and to permit this end to be readily accomplished, a handle 3 is provided. In the present instance, the handle has its lower portion bifurcated and the furcations 4 have their lower ends directed laterally and widened as indicated at 4 and riveted or otherwise securely fastened to the top of the cylinder. As the cylinder is forced into the fruit, it cuts its way down, but it is necessary to sever the core from the skin. In carrying out this end I provide a lever 6 which in the present instance is formed from a single metal bar bent upon itself to provide spaced arms 7. One arm is provided with an extension and this extension is bent to form an arcuate cutting blade 8. It is adapted to swing into the cylinder and to permit it to be properly operated, the cylinder is equipped with an arcuate slot 9 through which it may be projected as indicated in Figure 2. The lever is pivoted upon the rod 10 extending transversely through the top of the cylinder.

It has been stated before that slicing means is provided for severing pulp. Although this means could be constructed otherwise, it preferably comprises a pair of spaced parallel cutting blades 11 pivoted to inturned ears 12 extending into the cylinder as more plainly seen in Figure 3. To permit these blades to swing into the cylinder, the latter is provided with spaced vertical slots. For moving the blades into the cylinder, I provide a pivotally mounted handle 13 which has its major portion confined between the aforesaid furcations 4 and has its lower end connected to a link 14 which is in turn pivotally connected to the ears 15 on said cutting blades. If desired, appropriate spring means may be used in connection with the handle 13 for normally moving it in a manner to automatically project the cutting blades 11 to the position seen in Figure 2, as soon as the handle is released. For convenience of operation, the handle is equipped with a finger piece 16.

The operation of the device is as follows: The lever 6 is grasped and moved toward the handle 3 to swing the arcuate blade 8 into the cylinder 1 slightly so that it will not interfere with the initial operation of the latter. Likewise, the finger piece 16 is depressed to retract the cutting blades 11 into the cylinder. The latter is then forced downwardly into the center of a halved grapefruit, and the cutting edge 2 cuts its way through the webs and pulp. When the cylinder reaches the bottom, the lever 6 is moved toward the handle 3 in a manner to cause the blade 8 to sweep across the bottom and to partially sever the core. Then, the implement is turned bodily in a direction to completely sever the core. Then the core is removed and the implement is withdrawn, causing the spring means to project the blades 11 to the position seen in Figure 2. As the edge 17 of the web 18 is sharp, and as the curved edges 19 of the blades 11 are also sharp, when the slicer thus moves outwardly, the pulp is severed from the cell walls and skin by the double cutting action. To cut the pulp from the next cell, the slicer is retracted and the implement bodily turned to properly position it.

Having thus described the invention, what I claim is: —

1. A coring implement of the class described comprising a cylinder having its lower edge sharpened to provide a cutting edge, said cylinder being provided in one side with an arcuate slot, a handle connected to the cylinder for manipulating it, a lever also pivotally mounted upon the cylinder, said lever being provided with an arcuate cutting blade projectable through said slot.

2. A coring implement of the class described comprising a cylinder having its lower edge sharpened to provide a cutting edge, said cylinder being provided in its wall with an arcuate slot, a handle, said handle having its lower portion bifurcated and the furcations being connected with the top of said cylinder, a lever pivoted to the upper portion of the cylinder and swingable between said furcations, said lever being provided with an arcuate cutting blade cooperable with the aforesaid arcuate slot.

3. A coring implement of the class described comprising a cylinder having its lower edge sharpened to provide a cutting edge, a handle carried by said cylinder, said cylinder being provided at one side with vertical slots, a pair of slicing blades pivotally mounted upon the cylinder and movable through said slots into the cylinder, operating means for said blade, an arcuate blade adapted to coact with the first named cutting edge for severing the core, said cylinder being provided with an arcuate slot through which said blade is projectable.

In testimony whereof I affix my signature.

JOHN B. GRAINGE.